United States Patent
Seo et al.

(10) Patent No.: US 9,930,406 B2
(45) Date of Patent: *Mar. 27, 2018

(54) MEDIA CHANNEL IDENTIFICATION WITH VIDEO MULTI-MATCH DETECTION AND DISAMBIGUATION BASED ON AUDIO FINGERPRINT

(71) Applicant: Gracenote, Inc., Emeryville, CA (US)

(72) Inventors: Chung Won Seo, Seoul (KR); Youngmoo Kwon, Goyang (KR); Jaehyung Lee, Seoul (KR)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,354

(22) Filed: Aug. 31, 2016

(65) Prior Publication Data

US 2017/0251249 A1   Aug. 31, 2017

Related U.S. Application Data

(63) Continuation-in-part of application No. 15/222,405, filed on Jul. 28, 2016, and a continuation-in-part of application No. 15/179,143, filed on Jun. 10, 2016.
(Continued)

(51) Int. Cl.
*H04H 60/32* (2008.01)
*H04N 21/442* (2011.01)
(Continued)

(52) U.S. Cl.
CPC ..... *H04N 21/44204* (2013.01); *H04N 21/435* (2013.01); *H04N 21/44008* (2013.01); *H04N 21/6118* (2013.01); *H04N 21/84* (2013.01)

(58) Field of Classification Search
CPC combination set(s) only.
See application file for complete search history.

(56) References Cited

U.S. PATENT DOCUMENTS 7,653,921 B2  1/2010  Herley
8,510,770 B1  8/2013  Oztaskent et al.
(Continued)

FOREIGN PATENT DOCUMENTS

EP    2 704 444     3/2014
JP    2015008508    1/2015
(Continued)

OTHER PUBLICATIONS

US 9,189,826, 11/2015, Sharifi (withdrawn)
(Continued)

*Primary Examiner* — Mulugeta Mengesha
(74) *Attorney, Agent, or Firm* — McDonnell Boehnen Hulbert & Berghoff LLP (57) ABSTRACT

Disclosed are methods and systems to help disambiguate channel identification in a scenario where a video fingerprint of media content matches multiple reference video fingerprints corresponding respectively with multiple different channels. Given such a multi-match situation, an entity could disambiguate based on an audio component of the media content, such as by further determining that an audio fingerprint of the media content at issue matches an audio fingerprint of just one of the multiple channels, thereby establishing that that is the channel on which the media content being rendered by the media presentation device is arriving.

20 Claims, 6 Drawing Sheets

Related U.S. Application Data (60) Provisional application No. 62/301,616, filed on Feb. 29, 2016.

(51) Int. Cl.
*H04N 21/435* (2011.01)
*H04N 21/44* (2011.01)
*H04N 21/84* (2011.01)
*H04N 21/61* (2011.01)

(56) References Cited

U.S. PATENT DOCUMENTS

| | | | |
|---|---|---|---|
| 8,700,194 B2 | 4/2014 | Bauer et al. | |
| 9,094,715 B2 | 7/2015 | Neumeier et al. | |
| 9,203,538 B2 | 12/2015 | Anniballi et al. | |
| 2002/0083060 A1 | 6/2002 | Wang et al. | |
| 2003/0063217 A1 | 4/2003 | Smith | |
| 2004/0143349 A1 | 7/2004 | Roberts et al. | |
| 2005/0144455 A1 | 6/2005 | Haitsma | |
| 2007/0055500 A1 | 3/2007 | Bilobrov | |
| 2007/0124756 A1 | 5/2007 | Covell et al. | |
| 2007/0217648 A1 | 9/2007 | Muehlbauer | |
| 2008/0060036 A1 | 3/2008 | Cox | |
| 2008/0082510 A1 | 4/2008 | Wang et al. | |
| 2010/0131970 A1 | 5/2010 | Falcon | |
| 2010/0293568 A1 | 11/2010 | Jarman | |
| 2010/0329547 A1 | 12/2010 | Cavet | |
| 2011/0075851 A1 | 3/2011 | LeBoeuf et al. | |
| 2011/0153050 A1* | 6/2011 | Bauer | G10L 19/018 700/94 |
| 2011/0273455 A1 | 11/2011 | Powar et al. | |
| 2011/0289098 A1 | 11/2011 | Oztaskent et al. | |
| 2011/0313856 A1 | 12/2011 | Cohen et al. | |
| 2012/0089911 A1 | 4/2012 | Hosking et al. | |
| 2012/0117584 A1 | 5/2012 | Gordon | |
| 2013/0011008 A1 | 1/2013 | Ikezoye et al. | |
| 2013/0205330 A1 | 8/2013 | Sinha et al. | |
| 2013/0254793 A1 | 9/2013 | Anniballi et al. | |
| 2013/0308818 A1 | 11/2013 | MacIntosh et al. | |
| 2014/0007152 A1* | 1/2014 | Pora | H04N 21/254 725/18 |
| 2014/0013352 A1 | 1/2014 | Shavit et al. | |
| 2014/0089307 A1 | 3/2014 | Garside et al. | |
| 2014/0115627 A1* | 4/2014 | Lee | H04N 21/812 725/34 |
| 2014/0193027 A1 | 7/2014 | Scherf et al. | |
| 2014/0196077 A1 | 7/2014 | Gordon et al. | |
| 2014/0236988 A1 | 8/2014 | Harron et al. | |
| 2014/0282662 A1 | 9/2014 | Major | |
| 2015/0089526 A1 | 3/2015 | Gordon | |
| 2015/0120839 A1 | 4/2015 | Kannan et al. | |
| 2015/0181263 A1 | 6/2015 | Gordon et al. | |
| 2016/0094877 A1 | 3/2016 | Heffernan et al. | |
| 2016/0127398 A1 | 5/2016 | Cohen | |
| 2017/0048566 A1 | 2/2017 | Srinivasan | |
| 2017/0308556 A1 | 10/2017 | Gonzales-Brenes, Jr. et al. | |
| 2017/0330474 A1 | 11/2017 | Rho et al. | |

FOREIGN PATENT DOCUMENTS

| | | |
|---|---|---|
| WO | WO2005/079499 | 9/2005 |
| WO | WO 2008/042953 | 4/2008 |

OTHER PUBLICATIONS

International Search Report and Written Opinion from International Application No. PCT/US2017/019908, dated May 22, 2017.
Office Action from U.S. Appl. No. 15/179,143, dated May 23, 2017.
Office Action from U.S. Appl. No. 15/443,580, dated Dec. 14, 2017.

* cited by examiner

MEDIA CHANNEL IDENTIFICATION WITH VIDEO MULTI-MATCH DETECTION AND DISAMBIGUATION BASED ON AUDIO FINGERPRINT

REFERENCE TO RELATED APPLICATIONS

This application is a continuation-in-part of U.S. patent application Ser. No. 15/222,405, filed Jul. 28, 2016, and of U.S. patent application Ser. No. 15/179,143, filed Jun. 10, 2016, each of which are hereby incorporated by reference in their entirety. Further, this application claims priority to U.S. Provisional Patent Application No. 62/301,616, filed Feb. 29, 2016, which is hereby incorporated by reference in its entirety. In addition, the disclosure of U.S. Patent Application Pub. No. 2015/0181263 is hereby incorporated by reference in its entirety.

BACKGROUND

A typical media presentation device operates to receive an analog or digital media stream representing media content having video and audio components and to render and output the media content on a user interface including a display screen and an audio speaker. Examples of such devices include, without limitation, televisions, multimedia presentation systems (e.g., having separate or integrated video-presentation and audio-presentation components), and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the video and audio components of the selected channel, and the television may be configured to render those video and audio components for presentation to a user. And as another example, a multimedia presentation system having separate or integrated display and loudspeaker components may be communicatively linked with a computer, set top box, or other receiver that has access to a myriad of television or online streaming media channels, and the receiver may be configured to receive user input selecting a particular channel, to responsively initiate receipt of the selected channel, and to provide a video component of the channel to the display for presentation to a user while providing an audio component of the media content to the loudspeaker for presentation to the user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered (e.g., being already rendered, currently being rendered, or being in queue to be rendered) by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference video fingerprint of each of the channels available to provide media content to the media presentation device (e.g., each of the channels within a subscription plan for a set-top box that supplies media content to the media presentation device) and that maps each reference video fingerprint to the channel on which the media content is provided. As the media presentation device receives and renders given media content, the media presentation device may then generate a video fingerprint of that media content and, through a network communication interface, report the generated video fingerprint to the network server for analysis. The network server may then compare the reported video fingerprint with the reference video fingerprint data to find a match with a reference video fingerprint and to thereby determine that the channel on which the media content is arriving is the channel that the reference data maps with that reference video fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be provided on multiple different channels, whether concurrently or at different times, and so a video fingerprint of media content being rendered by a media presentation device may not correlate with just the channel on which the media content is arriving. For example, a sports game or political event might be broadcast concurrently on multiple different channels, or a syndicated television or radio show might be broadcast on multiple different such channels concurrently or at different times. In these or other scenarios, if the media presentation device is presenting such media content and generates and provides a video fingerprint of the media content, that video fingerprint could be mapped to multiple reference video fingerprints, and consequently the channel-identification would be inconclusive.

As a specific example of this, consider a scenario where two different content providers both broadcast the same sports game, each on a separate respective channel, and where an advertiser has a contract with just one of the content providers to present a pop-up advertisement on that provider's broadcast of the game. In this scenario, when a media presentation device is receiving and presenting one of these broadcasts, if the media presentation device generates and provides to the network server a video fingerprint of the broadcast, the network server may determine that the video fingerprint matches both content providers' broadcasts of the game, and so it would be unclear whether the media presentation device should present the pop-up advertisement or not.

Disclosed herein are methods and systems to help disambiguate channel identification in a scenario where video fingerprint data of media content matches multiple reference video fingerprints corresponding respectively with multiple different channels. In accordance with the disclosure, when a network server or other entity detects such a multi-match situation, the entity will then perform disambiguation based on an audio component of the media content. In particular, the entity may first detect a multi-match scenario by determining that a video fingerprint of the media content at issue matches reference video fingerprints of multiple different channels. Faced with that detected multi-match scenario, the entity will then perform disambiguation based on a further determination that an audio fingerprint of the media content at issue matches an audio fingerprint of just one of the multiple channels, thereby establishing that that is the channel on which the media content being rendered by the media presentation device is arriving, so as to facilitate taking channel-specific action.

In practice, the audio that forms the basis for this disambiguation could be a language track of the media content. For instance, the multiple channels might have the same video track as each other, but they might have different audio tracks than each other, such as with one being recorded or dubbed in an English voice and another being recorded or dubbed in a Spanish voice or in another language or voice. This situation could arise, for example, where the same broadcast is provided on different channels but where the channels have different languages to facilitate receipt and enjoyment by users who speak different languages. Faced with a multi-match situation keyed to the video tracks of such channels, the entity carrying out this process could use an audio fingerprint of the media content being rendered as a basis to determine which of the channels is the one being rendered by the media presentation device.

Alternatively or additionally, the audio that forms the basis for this disambiguation could take other forms, including, for instance, background music, sound effects, and/or other audio components.

Accordingly, disclosed is a method that involves taking action based on a channel determined through disambiguation based on an audio fingerprint. The method includes a computing system determining that a video fingerprint of media content being rendered by a media presentation device matches multiple reference video fingerprints each corresponding with a different respective channel. Further, the method includes, responsive to at least determining that the video fingerprint matches the multiple reference video fingerprints each corresponding with a different respective channel, performing disambiguation based at least in part on a determination that an audio fingerprint of the media content being rendered by the media presentation device matches a reference audio fingerprint corresponding with just a single channel, the disambiguation establishing that the media presentation device is receiving the media content on the single channel. And the method includes taking action based on the establishing that the media presentation device is receiving the media content on the single channel.

Further, disclosed a system including a network communication interface, a processing unit, non-transitory data storage, and program instructions stored in (e.g., on) the non-transitory data storage and executable by the processing unit to carry out various operations. The operations include receiving from a media presentation device, via the network communication interface, a video fingerprint of media content being rendered by the media presentation device. Further, the operations include determining that the received video fingerprint matches reference video fingerprints corresponding with multiple channels. Still further, the operations include receiving from the media presentation device, via the network communication interface, an audio fingerprint of the media content being rendered by the media presentation device. And the operations include using the received audio fingerprint to determine which of the multiple channels carries the media content being rendered by the media presentation device. The operations then include taking action based on the determined channel.

And still further, disclosed is a non-transitory computer readable medium having stored thereon instructions executable by a processing unit to carry out various operations such as those described herein.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
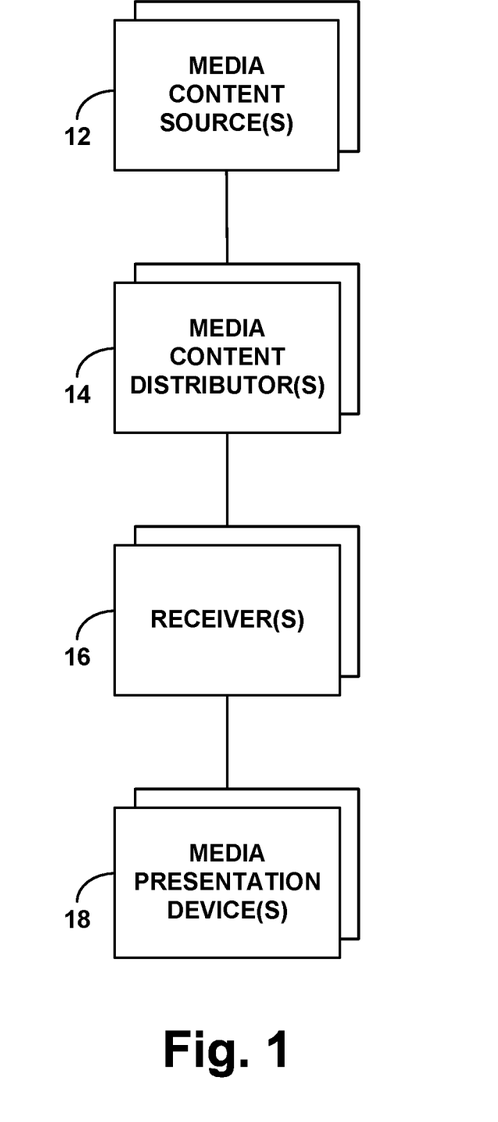
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors within particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
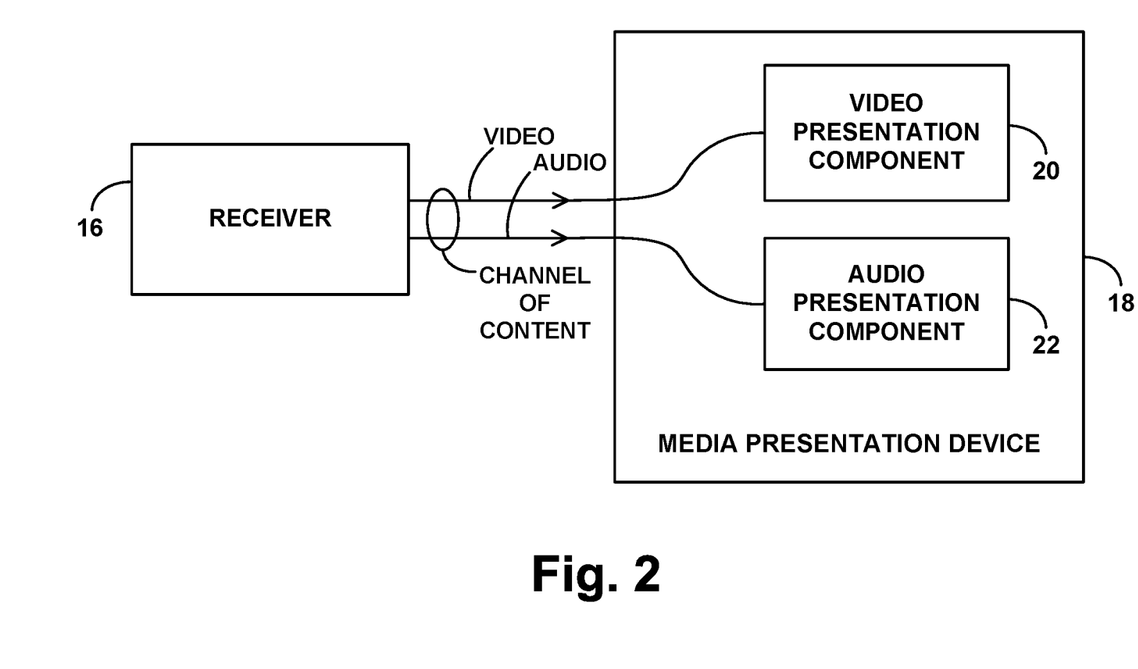
FIG. 2 is a simplified block diagram of an arrangement in which a media presentation device receives media content, including video and audio components, from a receiver.

FIG. 2 illustrates an example arrangement in which a media presentation device 18 is configured to receive a channel of media content from a receiver 16 and to render the media content for presentation to a user. In this arrangement, the media presentation device could be of the type described above, such as a television or other system that includes integrated or separate video and audio presentation components 20, 22 (e.g., a video display module and associated software/hardware and an audio output module and associated software/hardware). And the receiver could be of the type described above, such as a cable-TV set top box, a computer or the like, configured to selectively tune to and output any of a variety of channels of media content. In practice, the media presentation device could have one or more connections (e.g., wired or wireless connections) with the receiver, to facilitate receiving from the receiver the video and audio components (e.g., video and audio tracks) of a channel to which the receiver is tuned. And the video and audio presentation components 20, 22 of the media presentation device could then operate to render the video and audio being received from the receiver, for presentation to a user.

Figure 3:
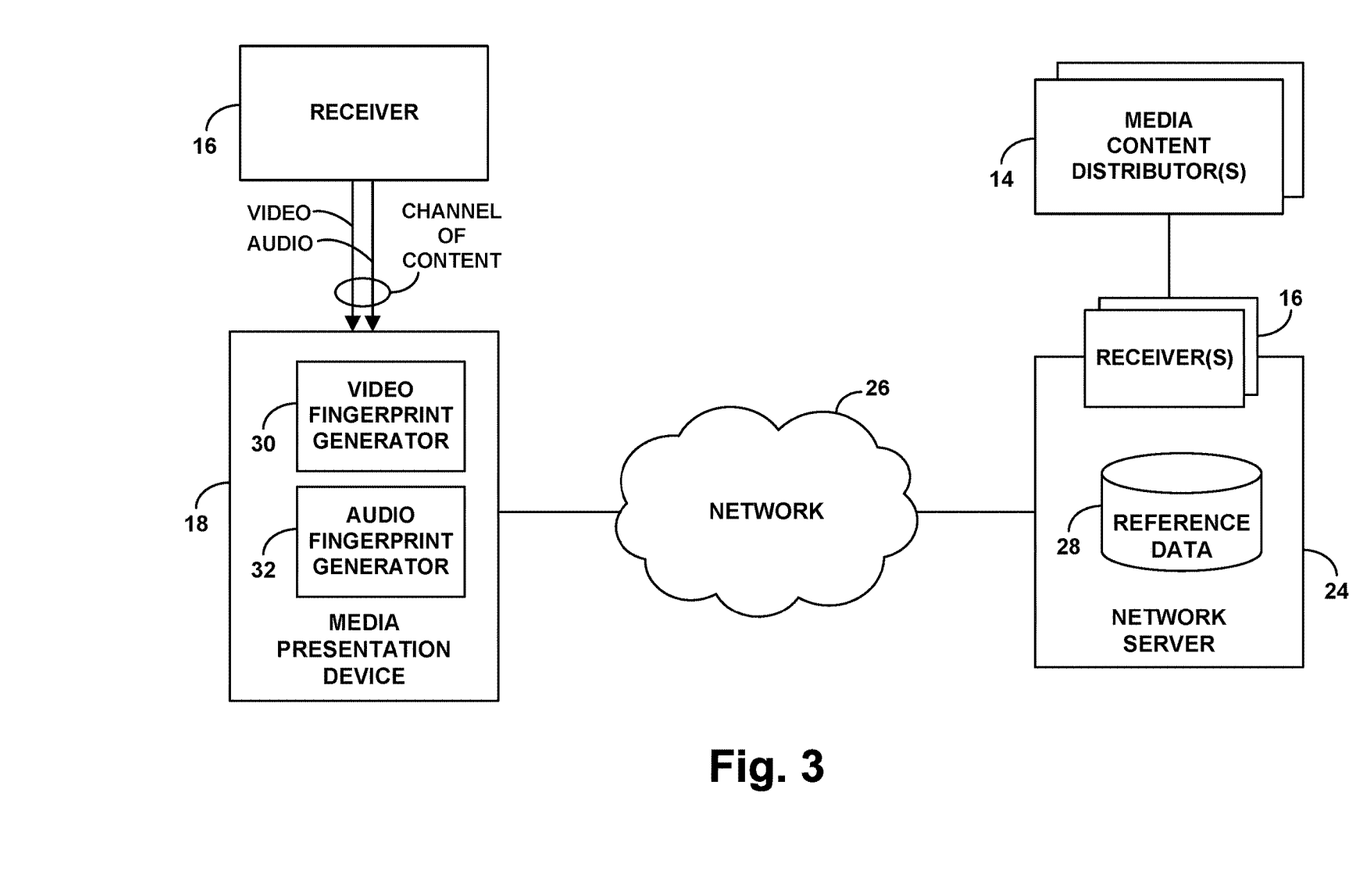
FIG. 3 is a simplified block diagram of an example network arrangement in which a media presentation device communicates with a network server to facilitate implementing various disclosed principles.

FIG. 3 next illustrates an example network arrangement in which such a media presentation device 18 is in communication with a network server 24 via a network 26, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 24 may also be accessible at an IP address on the Internet. With this arrangement, the media presentation device may initiate and engage in IP communication with the network server via the Internet, to report fingerprints of media content being rendered by the media presentation device, so as to facilitate channel identification and associated action.

As discussed above, the network server 24 or another entity operating in accordance with the present disclosure could establish or have access to reference data 28 for media content that is carried or scheduled to be carried on at least each of various channels accessible to the media presentation device 18. The reference data, which could be stored in a relational database or other form, could include one or more reference fingerprints for each channel, perhaps reference fingerprint streams of media content that was most recently carried by the channel (e.g., on a sliding window basis covering a most recent period of time). Alternatively or additionally, the reference data could include one or more respective reference fingerprints (e.g., reference fingerprint streams) of each media content program (e.g., television broadcast, streaming media file, etc.) that is available and/or scheduled to be carried on a particular channel. Further, the reference data could map each reference fingerprint to a channel on which the associated media content (i.e., the content uniquely identified by the reference video and audio fingerprints) is or may be carried.

Optimally, for instance, the reference data for each channel could include a reference video fingerprint of a video component of the channel and a reference audio fingerprint of an audio component of the channel. For instance, for each channel, the reference data could store in association with a data record a respective reference video fingerprint (e.g., reference video fingerprint stream) and a respective audio fingerprint (e.g., reference audio fingerprint stream). And the reference data could additionally include store in association with the data record a mapping with the associated channel.

In mapping reference fingerprints to channels, the reference data could characterize the channels by various attributes, to help distinguish the channels from each other. For example, where a receiver or other such device provides multiple different channels selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distribute content sources' content, the reference data could characterize the channels by their respective content distributors' identities. In practice, the reference data could correlate each reference fingerprint with one or more of these or other attributes.

The network server 24 or other entity operating in accordance with the present disclosure could establish some or all of this reference data by analyzing media content arriving on each of the various channels (e.g., at least the media content arriving on each of various channels that are available to a receiver that serves the media presentation device). To facilitate this, as shown, the server could include or be interconnected with one or more receivers 16 that are configured to receive media content from one or more of the media content distributors 14 on various channels in much the same way that receivers would be configured to receive content at customer premises. For instance, the server could include or be interconnected with one or more cable-TV set top boxes, computers, or other media receivers, or could be configured to emulate one or more such receivers. The server could then be configured to receive and analyze the respective media content arriving on each channel and to generate for each channel both a reference video fingerprint of the channel's video component and an audio fingerprint of the channel's audio component, using any media fingerprinting process(es) now known or later developed (e.g., computing a hash on a per frame or other basis, or otherwise identifying, extracting and digitally representing component features unique to the media content).

In practice, the server could be configured to receive concurrently on multiple such channels (perhaps all of the channels) and to analyze and generate respective fingerprints for the channels in parallel, or the server might be configured to hop from channel to channel, possibly repeatedly cycling through the channels, to analyze and generate a respective video and audio fingerprints for each channel. Further, the server could continue to do this in real-time, saving respective video and audio fingerprints of at least a most recent time window of media content for each channel, for reference. And the server could record each channel's reference fingerprints in the reference data in association with a characterization of the channel (e.g., with attributes such as those noted above) and timestamp information indicating a time of receipt of the associated media content. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint or channel record.

Alternatively or additionally, the server could receive or perhaps establish such video and audio reference fingerprints for media content programs that are available or scheduled to be provided on particular channels. For instance, providers or distributors of various media content programs could generate reference video and audio fingerprints for the media content programs, again using any media fingerprinting process now known or later developed, and those reference fingerprints could be provided to the server. Alternatively, the server could receive advance copies of the media content programs and could itself generate such reference fingerprints. Further, the server could receive or determine from program guide information the channel on which the media content program is available or scheduled to be provided, and perhaps a day and time at which the media content is scheduled to be provided. The server could then record each media content program's reference fingerprints in the reference data in association with the channel on which the media content program is available or scheduled to be carried, likewise with associated channel attributes, and perhaps in association with a day and time at which the media content program is scheduled to be provided.

Still further, the server could generally establish just a reference video fingerprint, and not a reference audio fingerprint, respectively for each channel or media content program, to facilitate channel identification. And the server could then start establishing a reference audio fingerprint of each of one or more specific channels in response to a determination that a video multi-match situation exists with respect to those channels, so as to then help resolve the multi-match situation.

Given this or other such reference data, when the server is presented with a fingerprint of media content that was received on an unknown channel, the server could match the fingerprint with one of the stored reference fingerprints, using any fingerprint matching process now known or later developed, and could thereby conclude that the media content at issue arrived on the channel that the reference data maps to the matching reference fingerprint. Thus, if the server is faced with a fingerprint of media content that is being rendered by the media presentation device 18, the server could compare the fingerprint with the reference fingerprints in the reference data. And if the server thereby finds a matching reference fingerprint, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

In practice, the video fingerprint of a channel being rendered by a media presentation device may often be a sufficient basis, by comparison with reference video fingerprints of known channels, to identify the channel being rendered. Therefore, in general practice, the media presentation device 18 or another entity could be configured to generate a video fingerprint of the channel being rendered by the media presentation device and transmit the video fingerprint to server 24 for analysis.

As addressed by the present disclosure, however, there may also be times when the video fingerprint of a channel being rendered by the media presentation device matches multiple reference video fingerprints associated with multiple channels. And in such cases, the audio fingerprint of the channel being rendered could then be used as a basis to disambiguate. Therefore, either in general practice or in response to the occurrence of such a video multi-match situation, the media presentation device or other entity could also be configured to generate an audio fingerprint of the channel being rendered by the media presentation device and to transmit that audio fingerprint to server 26 as well for analysis.

For this purpose, FIG. 3 shows that the media presentation device 18 could include a video fingerprint generator 30 and an audio fingerprint generator 32, which could be provided as hardware and/or software (programmed processor) components for instance. The video fingerprint generator 30 could be configured to generate a digital video fingerprint of media content being rendered by the media presentation device, and the audio fingerprint generator 32 could be configured to generate a digital audio fingerprint of media content being rendered by the media presentation device. Further, such fingerprint generators could be configured to generate the fingerprints of media content as the media presentation device is receiving the media content from a receiver 16 and/or as the media presentation device is processing the media content for presentation. As such, the fingerprint generators could receive as input a copy of the media content arriving at the media presentation device from the receiver and/or being processed for presentation by the media presentation device, and to apply any media fingerprinting process now known or later developed to generate the fingerprints of the media content.

The video fingerprint generator 30 could be configured to generate a video fingerprint as a fingerprint stream on an ongoing basis, such as on a per frame basis (e.g., per key-frame basis) or other basis. And the media presentation device could be configured to transmit the video fingerprint via network 26 to a server 24 for analysis. By way of example, the media presentation device could be configured to periodically or from time to time transmit to the server a video fingerprint representing a latest frame, series of frames or other segment or portion of the media content being rendered by the media presentation device. In particular, the media presentation device could generate a message carrying the latest generated video fingerprint, along with one or more timestamps and/or other such data as well as an identifier of the media presentation device, and could transmit the message to the server's IP address. And the server may thereby receive the video fingerprint for analysis.

Alternatively, the media presentation device could transmit to the server, and the server could thus receive, various data regarding the media content being rendered by the media presentation device, likewise on an ongoing basis or other basis, to enable the server itself or another entity to generate a video fingerprint of the media content being rendered by the media presentation device. For example, the media presentation device could transmit to the server portions of the video component being rendered by the media presentation device, such as individual frames (e.g., snapshots) or other segments of the video component. And the server could apply any video fingerprinting process now known or later developed to generate a video fingerprint of the media content for analysis.

Through the process described above, the server could then compare the video fingerprint of the media content being rendered by the media presentation device with the reference video fingerprints in the reference data, using any digital video fingerprint comparison process now known or later developed. And as noted above, if the server thereby finds a matching reference video fingerprint, the server could determine the channel that the reference data maps with the matching reference video fingerprint and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a video fingerprint of the media content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content, and as video and/or audio content. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a video fingerprint of the media content being rendered by the media presentation device and the server determining that the received video fingerprint matches a reference fingerprint of media content that the server is concurrently receiving (or has scheduled for the same time) on a known channel.

In some cases, there may be a time difference between when the media presentation device renders the media content and timestamps and transmits the video fingerprint to the server and when the server receives the media content on the known channel and otherwise has the reference video fingerprint timestamped. The server could account for this time difference by comparing the received video fingerprint over a sliding window of the reference video fingerprint or vice versa. Further, the server could account for this time difference when taking action in response to a determined match between the received video fingerprint and the reference video fingerprint. For example, if the media presentation device receives the media content sufficiently earlier than the server's timestamp for the content (e.g., more than a few seconds earlier), the server could still identify a video fingerprint match and could record analytics data. But in response to detecting that time difference, the server might forgo having the media presentation device present associated supplemental content, to help avoid a situation where the media presentation device presents the supplemental content too late (e.g., out of sync) from a user's perspective. On the other hand, if the server detects a video fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 24 or other entity that has access to reference data as noted above could be configured to identify video multi-match scenarios, perhaps by detecting among the reference data various reference video fingerprints that match each other and that match a video fingerprint of media content being rendered by the media presentation device.

In one implementation, for instance, the server could regularly analyze the reference data in search of video multi-match scenarios, comparing pairs of video reference fingerprints in the reference data using any now known or later developed video fingerprint matching process, in an effort to find reference video fingerprints that match each other. Upon finding each such match of at least two of the reference video fingerprints, the server could then flag the reference video fingerprints as being a multi-match group. Such a flag could indicate that there will be a potential ambiguity if the video fingerprint of media content being rendered by the media presentation device matches any of the reference video fingerprints in the flagged multi-match group. The server could flag the reference video fingerprints as being a multi-match group in various ways. For instance, the server could cross-reference the reference video fingerprints of the multi-match group in the reference data, to indicate that they are members of a multi-match group.

With this implementation, when the server receives from a media presentation device a video fingerprint of media content being rendered by the media presentation device and the server determines that the received video fingerprint matches a reference video fingerprint, the server could then readily determine from the reference data whether a multi-match situation exists. If the matching reference video fingerprint is not flagged as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media content being rendered by the media presentation device. Whereas, if the matching reference video fingerprint is flagged as being a member of a multi-match group, then the server could conclude that a multi-match situation (rather than a single-match situation) exists, in which case the server may need to perform a disambiguation process to help identify the channel at issue from among those associated with the reference video fingerprints of the multi-match group.

Alternatively, in another implementation, the server could identify a video multi-match group at the time the server receives a video fingerprint from the media presentation device. For instance, when (e.g., as) the server receives the video fingerprint from the media presentation device, the server could compare the received video fingerprint with all of the reference video fingerprints in the reference data. If the server thereby detects that the received video fingerprint matches only one of the reference video fingerprints, then the server could conclude that a single-match situation (rather than a multi-match situation) exists, in which case the server could then readily determine from the reference data the channel associated with the matching reference fingerprint and could conclude that that is the channel carrying the media content being rendered by the media presentation device. Whereas, if the server detects that the received video fingerprint matches two or more of the reference video fingerprints, then the server could conclude that a multi-match situation (rather than a single-match situation) exists, in which case the server may need to perform a disambiguation process to help identify the channel at issue from among those associated with the reference video fingerprints of the multi-match group.

Note that, similar to the process discussed above, the process of detecting a multi-match situation involving two or more reference video fingerprints could be performed even if the two reference video fingerprints represent the same media content carried on two different channels at a time delay relative to one another, i.e., where the presentation of the media content on one of the channels is time shifted in relation to presentation of the same media content on another one of the channels. The fingerprint matching process could account for this time shifting and could still find a match if the video fingerprints otherwise match each other, such as by comparing one video fingerprint over a sliding window with the other video fingerprint. For instance, the process of finding matching reference video fingerprints within the reference data could involve searching for reference video fingerprints that match one another and are presented and/or scheduled at respective times that are within a threshold time interval of each other.

As noted above, when the server or other entity carrying out this analysis detects that the video fingerprint of the media content being rendered by the media presentation device matches multiple reference fingerprints corresponding respectively with multiple channels, the entity could apply a disambiguation process to help determine which of the channels associated with the multi-match group is the actual channel carrying the media content being rendered by the media presentation device.

In accordance with the present disclosure, the disambiguation process can be based on a further determination that an audio fingerprint of the media content being rendered by the media presentation device matches just a single channel.

As noted above, this form of disambiguation could apply in a situation where multiple channels provide the same video with associated audio and where the video on the channels is largely identical but where the channels have different audio tracks than each other. In this situation, the when faced with a video multi-match, the server or other entity could then make use of an audio fingerprint of the audio component being rendered by the media presentation device as a basis to disambiguate. In particular, the server could compare an audio fingerprint received from the media presentation device with reference audio fingerprints of the channels associated with the video multi-match group, and could thereby determine that the audio fingerprint matches the reference audio fingerprint of just one of those channels, thereby supporting a conclusion that that one channel is the channel carrying the media content being rendered by the media presentation.

To facilitate this in practice, as noted above, the server could regularly receive from the media presentation device an audio fingerprint (e.g., audio fingerprint stream) of the audio component being rendered by the media presentation device. And the server could regularly establish or receive reference data including reference audio fingerprints (e.g., reference audio fingerprint streams) of various available channels. Thus, when faced with the video multi-match situation, the server could readily compare the audio fingerprint from the media presentation device with the audio fingerprints of the multi-match group members in order to disambiguate.

Alternatively, as noted above, the server might regularly receive just a video fingerprint, and not an audio fingerprint, from the media presentation device, in which case, upon detecting a video multi-match situation, the server could then request the media presentation device to provide an audio fingerprint of the media content being rendered so as to facilitate disambiguation. Further, the server might regularly generate just a reference video fingerprint of each available channel, in which case, upon detecting a video multi-match situation, the server could then start generating audio fingerprints of the channels associated with the video multi-match group, so as to facilitate disambiguation.

Note also that, in some cases, the audio tracks of two different channels may be only partially different than each other. For instance, two channels may provide the same movie content as each other, including the same background music and sound effects, but the channels may have different language tracks than each other (e.g., with one being in English and the other being dubbed in Spanish). To account for partial audio-track differences like this, the server could perform audio fingerprint comparisons over a period of time and could identify and keep track of distinctions between audio tracks for use in disambiguating and resolving video multi-match scenarios.

For example, the server could receive an audio fingerprint stream from the media presentation for a period of time (e.g., about 60-120 seconds), and the server could determine that one time segment of the audio fingerprint stream matches multiple reference audio fingerprints of the multi-match group but could determine that another time segment of the audio fingerprint stream matches just one of the reference audio fingerprints, thereby establishing that the channel associated with the matching reference audio fingerprint is the channel at issue. U.S. patent application Ser. No. 15/222, 405 provides further discussion of using an earlier or later fingerprint time segment as a basis to perform such disambiguation, and the principles discussed there could be applied in this context as well.

Still further, in an implementation where the server evaluates reference video fingerprints in advance and flags video multi-match groups in the reference data, the server could compare the reference audio fingerprints of the channels associated with the multi-match group to determine if the reference audio fingerprints differ from each other and, if so, could further flag the video multi-match group to indicate that an audio-fingerprint analysis could facilitate disambiguation. For instance, the server could record in association with the video multi-match group a Boolean value or other indication that audio-fingerprint analysis could facilitate disambiguation. Upon later detecting a video multi-match situation with respect to a video fingerprint provided by the media presentation device, the server could then detect that the video multi-match group was so further flagged, and, in response to detecting the video multi-match situation and detecting the further flagging, the server could responsively start the process of seeking to disambiguate based on an audio fingerprint analysis.

Various aspects discussed above in connection the video fingerprint analysis could also apply with respect to the audio fingerprint analysis to facilitate multi-match disambiguation. For example, just as the media presentation device could provide the server with media content data (e.g., individual video frames or other segments of the media content being rendered) to enable the server itself to generate the video fingerprint of the media content for analysis, so too could the media presentation device provide the server with media content (e.g., audio segments of the media content being rendered) to enable the server itself to generate the audio fingerprint of the media content for analysis. As another example, just as the server could account for time-shifting when comparing video fingerprints and could be cautious to avoid taking certain action in response to a sufficiently stale video fingerprint data, so too could the server account for time-shifting when comparing audio fingerprints and could be cautious to avoid taking certain actions in response to sufficiently stale audio fingerprint data. And as yet another example, just as the server could use any video fingerprint matching process now known or later developed to compare video fingerprints, so too could the server use any audio fingerprint matching process now known or later developed to compare audio fingerprints. Other examples are possible as well.

In addition, note that while the discussion herein focuses primarily on server 24 identifying a video multi-match situation and then disambiguating based on audio fingerprint analysis, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, and the media presentation device could itself refer to the reference data to identify a video multi-match situation, to perform disambiguation based on audio fingerprint analysis, and to thereby identify the channel that provides the media content being rendered by the media presentation device. Further, in response to detecting a video multi-match situation, the media presentation device could then request and receive from the server reference audio fingerprints for the channels associated with the video multi-match group, or the media presentation device could be separately provisioned with such reference audio fingerprint data. And the media presentation device could then perform disambiguation itself by comparing such audio fingerprints with an audio fingerprint of the audio component being rendered. Still further, the media presentation device could then itself take channel-specific action, such as presenting channel-specific content, recording channel presentation, or the like, or could cause or work with one or more other entities to take such action.

Figure 4:
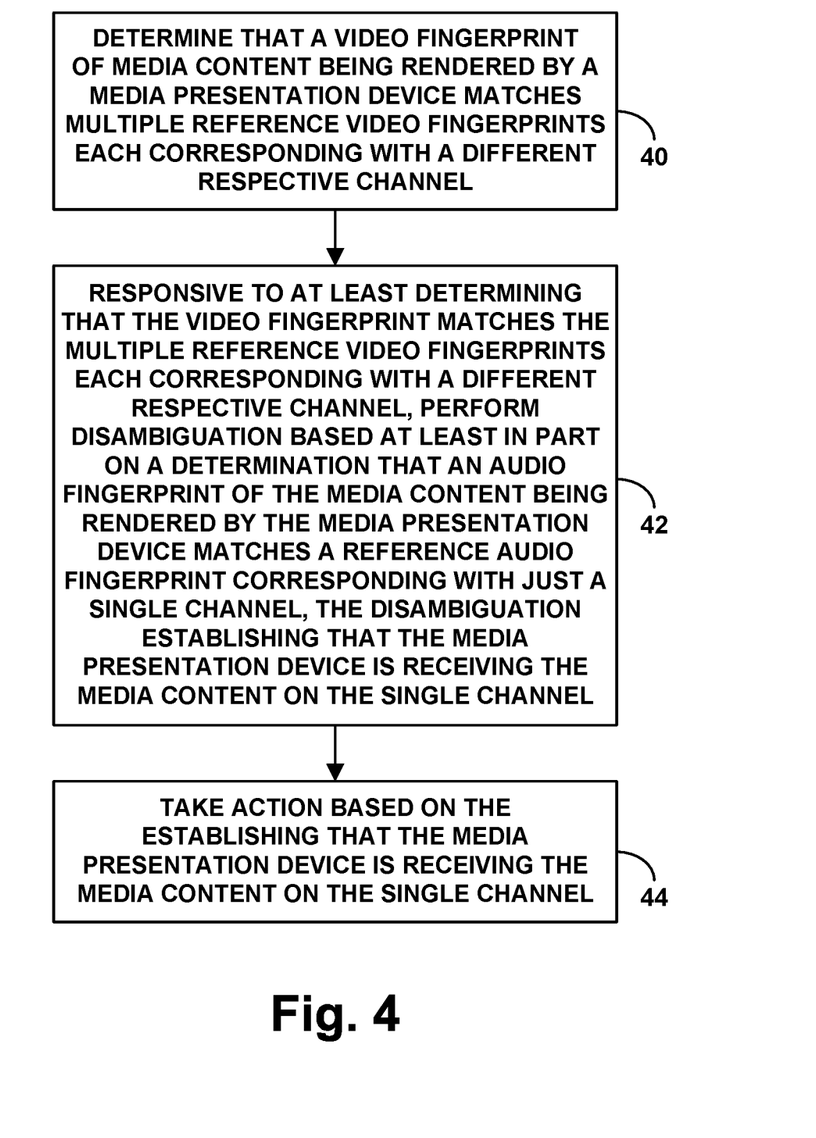
FIG. 4 is a flow chart depicting operations that can be carried out in accordance with the present disclosure.

FIG. 4 is next a flow chart depicting a method that can be carried out in line with the discussion above. One or more of the operations in the method depicted by FIG. 4 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 4, at block 40, the method includes a computing system determining that a video fingerprint of media content being rendered by a media presentation device matches multiple reference video fingerprints each corresponding with a different respective channel. At block 42, the method then includes, responsive to at least determining that the video fingerprint matches the multiple reference video fingerprints each corresponding with a different respective channel, performing disambiguation based at least in part on a determination that an audio fingerprint of the media content being rendered by the media presentation device matches a reference audio fingerprint corresponding with just a single channel, the disambiguation establishing that the media presentation device is receiving the media content on the single channel. And at block 44, the method includes taking action based on the establishing that the media presentation device is receiving the media content on the single channel.

As discussed above, the media content being rendered by the media presentation device could have a video track and an audio track (e.g., at least a language track), and the video fingerprint could be a fingerprint of the video track and the audio fingerprint could be a fingerprint of the audio track.

Further, as discussed above, where the computing system is a server or other entity other than the media presentation device, the media presentation device could generate the video and audio fingerprints of the media content being rendered by the media presentation device, and the computing system could receive those fingerprints from the media presentation device.

Still further, in an example implementation, the multiple reference fingerprints could be selected from a plurality of reference fingerprints in reference data, in which case determining that the video fingerprint of the media content being rendered by the media presentation device matches the multiple reference video fingerprints could involve (i) comparing the video fingerprint of the media content being rendered by the media presentation device with the plurality of reference video fingerprints in the reference data, and (ii) based on the comparing, determining that the video fingerprint of the first segment of the media content being rendered by the media presentation device matches the multiple reference video fingerprints.

And yet further, the method could also include detecting and flagging a multi-match group consisting of the multiple reference fingerprints, in which case the act of determining that the video fingerprint of the media content being rendered by the media presentation device matches the multiple reference video fingerprints could involve determining that the video fingerprint of the media content being rendered by the media presentation device matches the reference video fingerprints of the flagged multi-match group.

And the method could additionally include (i) comparing audio fingerprints corresponding with the video fingerprints of the flagged multi-match group, (ii) detecting, based on the comparing, a difference between the compared audio fingerprints; and (iii) responsive to detecting the difference, further flagging the multi-match group to indicate that audio-fingerprint analysis could facilitate disambiguation. And in that case, the act of performing disambiguation based on the determination that the audio fingerprint of the media content being rendered by the media presentation device matches a reference audio fingerprint corresponding with just a single channel could be further responsive to determining that the multi-match group is further flagged to indicate that audio-fingerprint analysis could facilitate disambiguation.

Also in line with the discussion above, the method could include making the determination that the audio fingerprint of the media content being rendered by the media presentation device matches a reference audio fingerprint corresponding with just a single channel. For instance, the method could include (i) comparing the audio fingerprint of the media content being rendered by the media presentation device with reference audio fingerprints corresponding with the same channels as the multiple reference video fingerprints, and (ii) based on the comparing, determining that the audio fingerprint of the media content being rendered by the media presentation device matches just a single one of the reference audio fingerprints.

Further, as discussed above, the computing system could be an entity other the media presentation device. And the method could further include, responsive to at least determining that the video fingerprint matches the multiple reference video fingerprints each corresponding with a different respective channel, the computing system requesting and receiving from the media presentation device the audio fingerprint of the media content being rendered by the media presentation device, so as to facilitate the performing of disambiguation based on the obtained audio fingerprint.

And still further, the method could include, responsive to at least determining that the video fingerprint matches the multiple reference fingerprints each corresponding with a different channel, generating the reference audio fingerprints corresponding with the same channels as the multiple reference video fingerprints, so as to facilitate the comparing.

Moreover, as discussed above, the act of taking action based on the establishing that the media presentation device is receiving the media content on the single channel could involve taking an action selected from the group consisting of (i) causing supplemental channel-specific content to be presented in conjunction with the media content being rendered by the media presentation device and (ii) recording presentation of the single channel for use in a channel ratings system. And, as noted above, the method can be carried out at least in part by the media presentation device.

Figure 5:
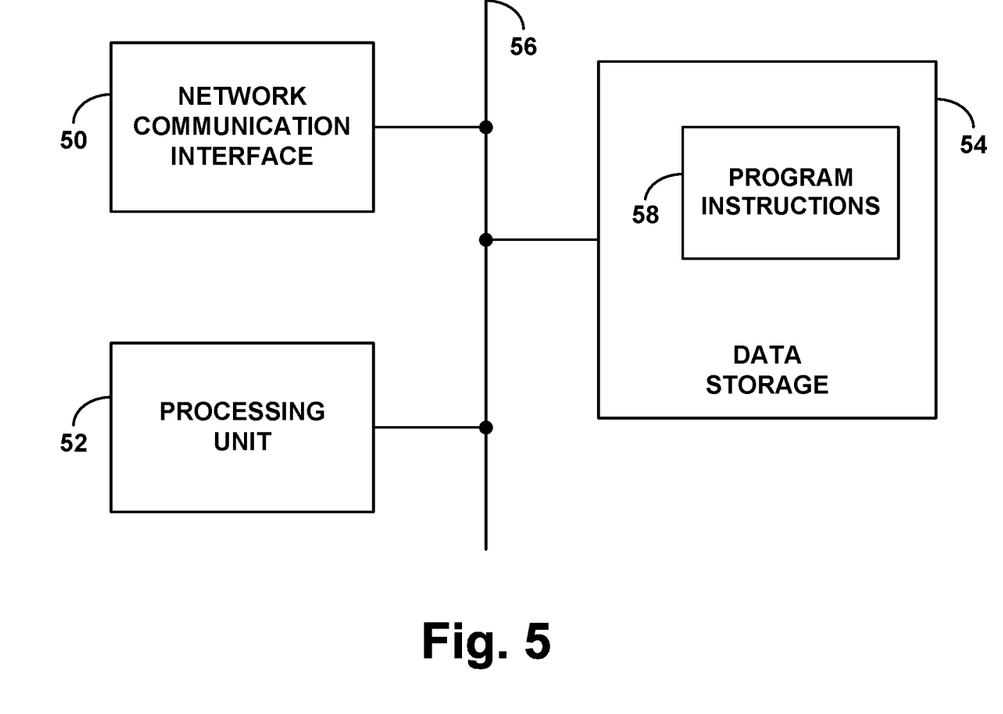
FIG. 5 is a simplified block diagram of an example network server.

FIG. 5 is next a simplified block diagram of an example system operable in accordance with the present disclosure. This system could represent a network server as described above, and/or one or more other entities (possibly including the media presentation device). As shown in FIG. 5, the example system includes a network communication interface 50, a processing unit 52, non-transitory data storage 54, any or all of which could be integrated together or, as shown, communicatively linked together by a system bus, network, or other connection mechanism 56.

Network communication interface 50 could comprise one or more physical network connection mechanisms to facilitate communication on a network such as network 26 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 52, could then comprise one or more general purpose processors (e.g., microprocessors) and/or one or more specialized processors (e.g., application specific integrated circuits). And non-transitory data storage 54 could comprise one or more volatile and/or non-volatile storage components, such as optical, magnetic, or flash storage.

As shown, data storage 54 then stores program instructions 58, which could be executable by processing unit 52 to carry out various operations described herein. For example, the program instructions could be executable to (i) receive from a media presentation device, via the network communication interface, a video fingerprint of media content being rendered by the media presentation device, (ii) determine that the received video fingerprint matches reference video fingerprints corresponding with multiple channels, (iii) receive from the media presentation device, via the network communication interface, an audio fingerprint of the media content being rendered by the media presentation device, (iv) using the received audio fingerprint to determine which of the multiple channels carries the media content being rendered by the media presentation device, and (v) taking action based on the determined channel.

These operations could take various forms, in line with the discussion here. For example, the act of receiving from the media presentation device the audio fingerprint of the media content being rendered by the media presentation device could occur at some point before determining that the received video fingerprint matches reference video fingerprints corresponding with multiple channels, perhaps receiving the audio fingerprint along with the video fingerprint. Alternatively, the act of act of receiving from the media presentation device the audio fingerprint of the media content being rendered by the media presentation device could occur in response to determining that the received video fingerprint matches reference video fingerprints corresponding with multiple channels, such as by responding to the video multi-match by sending to the media presentation device a request for the audio fingerprint of the media content being rendered by the media presentation device and receiving the audio fingerprint in response to sending that request. Other examples are also possible.

Figure 6:
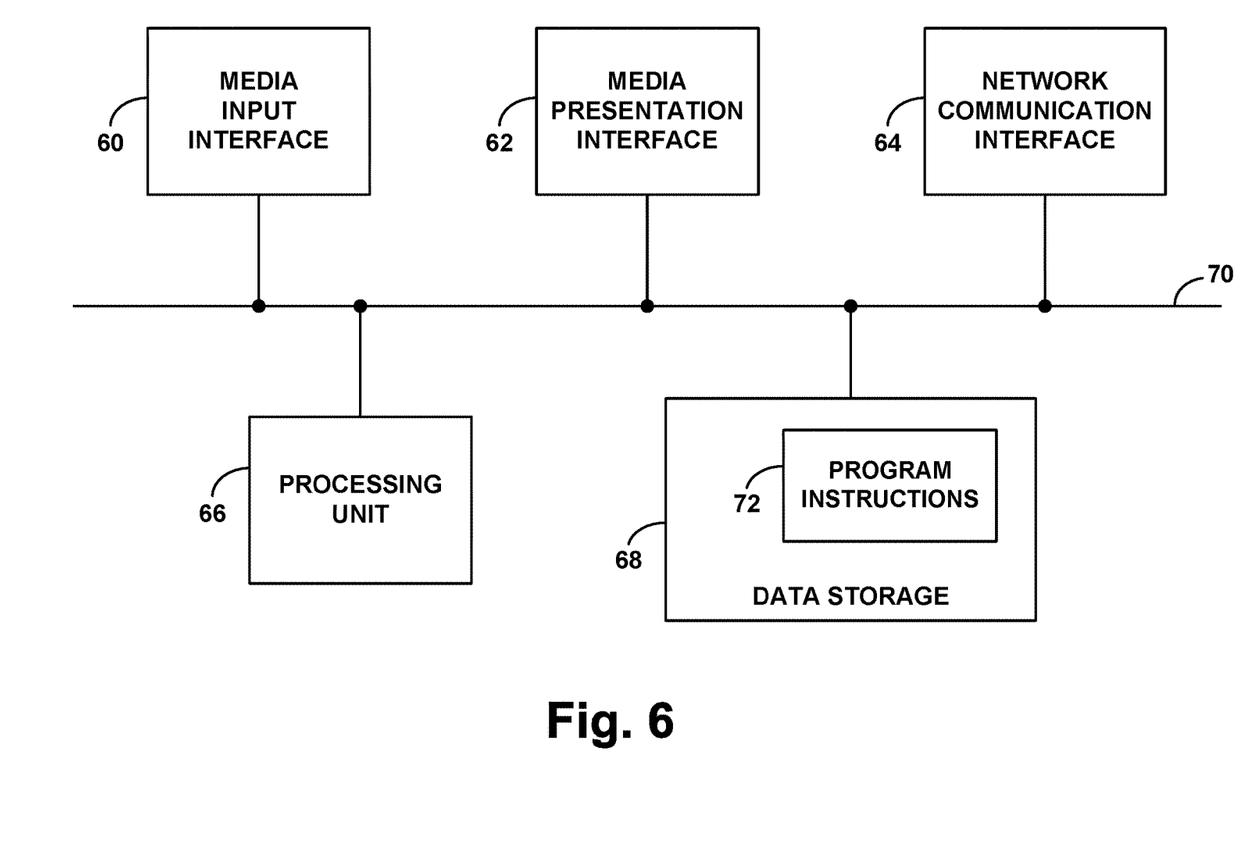
FIG. 6 is a simplified block diagram of an example media presentation device.

Finally, FIG. 6 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example media presentation device includes a media input interface 60, a media presentation interface 62, a network communication interface 64, a processing unit 66, and non-transitory data storage 68, any or all of which could be integrated together or, as shown, communicatively linked together by a system bus, network, or other connection mechanism 70.

Media input interface 60 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 62 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 64 could comprise a physical network connection mechanism to facilitate communication on a network such as network 26 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 66 could then comprise one or more general purpose processors (e.g., microprocessors) and/or one or more specialized processors (e.g., application specific integrated circuits). And non-transitory data storage 68 could comprise one or more volatile and/or non-volatile storage components, such as optical, magnetic, or flash storage. Further, as shown, data storage 68 stores program instructions 72, which could be executable by processing unit 66 to carry out various operations described here. For example, the program instructions could be executable to generate on an ongoing basis or upon request a video fingerprint and an audio fingerprint of media content being rendered by the media presentation device, based on analysis of the media content being received at the media input interface 60 and/or being processed at the media presentation interface, and to provide the generated fingerprints on an ongoing basis or upon request to facilitate channel identification as described herein.

Exemplary embodiments have been described above. Those skilled in the art will understand, however, that changes and modifications may be made to these embodiments without departing from the true scope and spirit of the invention.

What is claimed is:

1. A method comprising:
   determining, by a computing system, that a digital video fingerprint of media content being rendered by a media presentation device matches multiple reference video fingerprints each corresponding with a different respective channel;
   responsive to at least determining that the digital video fingerprint matches the multiple reference video fingerprints each corresponding with a different respective channel, performing disambiguation by the computing system based at least in part on a determination that a digital audio fingerprint of the media content being rendered by the media presentation device matches a reference audio fingerprint corresponding with just a single channel, the disambiguation establishing that the media presentation device is receiving the media content on the single channel, wherein performing disambiguation based at least in part on the determination that the digital audio fingerprint of the media content being rendered by the media presentation device matches the reference audio fingerprint corresponding with just the single channel comprises (i) comparing the digital audio fingerprint of the media content being rendered by the media presentation device with reference audio fingerprints corresponding with the same channels as the multiple reference video fingerprints, and (ii) based on the comparing, determining that the digital audio fingerprint of the media content being rendered by the media presentation device matches just a single one of the reference audio fingerprints; and taking action by the computing system based on the establishing that the media presentation device is receiving the media content on the single channel.

2. The method of claim 1, wherein the media content being rendered by the media presentation device has a video track and an audio track, wherein the digital video fingerprint is a fingerprint of the video track and the digital audio fingerprint is a fingerprint of the audio track.

3. The method of claim 1, wherein the digital audio fingerprint of the media content being rendered by the media presentation device represents at least a language track of the media content being rendered by the media presentation device.

4. The method of claim 1, wherein the computing system is an entity other than the media presentation device, and wherein the digital video fingerprint and digital audio fingerprint are generated by the media presentation device, the method further comprising:

receiving by the computing system, from the media presentation device, the digital video fingerprint and the digital audio fingerprint.

5. The method of claim 1, wherein the multiple reference video fingerprints are selected from a plurality of reference video fingerprints in reference data, and wherein determining that the digital video fingerprint of the media content being rendered by the media presentation device matches the multiple reference video fingerprints comprises:

comparing the digital video fingerprint of the media content being rendered by the media presentation device with the plurality of reference video fingerprints in the reference data, and based on the comparing, determining that the digital video fingerprint of the media content being rendered by the media presentation device matches the multiple reference video fingerprints.

6. The method of claim 1, further comprising detecting and flagging a multi-match group consisting of the multiple reference video fingerprints, wherein determining that the digital video fingerprint of the media content being rendered by the media presentation device matches the multiple reference video fingerprints comprises determining that the digital video fingerprint of the media content being rendered by the media presentation device matches the reference video fingerprints of the flagged multi-match group.

7. The method of claim 6, further comprising:

comparing reference audio fingerprints corresponding with the reference video fingerprints of the flagged multi-match group;

detecting, based on the comparing, a difference between the compared reference audio fingerprints; and responsive to detecting the difference, further flagging the multi-match group to indicate that audio-fingerprint analysis could facilitate disambiguation, wherein performing disambiguation based on the determination that the digital audio fingerprint of the media content being rendered by the media presentation device matches a reference audio fingerprint corresponding with just a single channel is further responsive to determining that the multi-match group is further flagged to indicate that audio-fingerprint analysis could facilitate disambiguation.

8. The method of claim 1, wherein the computing system is an entity other than the media presentation device, the method further comprising:

responsive to at least determining that the digital video fingerprint matches the multiple reference video fingerprints each corresponding with a different respective channel, requesting and receiving by the computing system from the media presentation device the digital audio fingerprint of the media content being rendered by the media presentation device, to facilitate the performing of disambiguation based on the obtained digital audio fingerprint.

9. The method of claim 1, further comprising:

responsive to at least determining that the digital video fingerprint matches the multiple reference fingerprints each corresponding with a different channel, generating the reference audio fingerprints corresponding with the same channels as the multiple reference video fingerprints, to facilitate the comparing.

10. The method of claim 1, wherein taking action based on the establishing that the media presentation device is receiving the media content on the single channel comprises causing supplemental channel-specific content to be presented in conjunction with the media content being rendered by the media presentation device.

11. The method of claim 1, carried out at least in part by the media presentation device.

12. The method of claim 1, wherein taking action based on the establishing that the media presentation device is receiving the media content on the single channel comprises recording presentation of the single channel for use in a channel ratings system.

13. A non-transitory computer readable medium having stored thereon instructions executable by a processing unit to carry out operations comprising:

determining that a digital video fingerprint of media content being rendered by a media presentation device matches multiple reference video fingerprints each corresponding with a different respective channel;

responsive to at least determining that the digital video fingerprint matches the multiple reference video fingerprints each corresponding with a different respective channel, performing disambiguation based at least in part on a determination that a digital audio fingerprint of the media content being rendered by the media presentation device matches a reference audio fingerprint corresponding with just a single channel, the disambiguation establishing that the media presentation device is receiving the media content on the single channel, wherein performing disambiguation based at least in part on the determination that the digital audio fingerprint of the media content being rendered by the media presentation device matches the reference audio fingerprint corresponding with just the single channel comprises (i) comparing the digital audio fingerprint of the media content being rendered by the media presentation device with reference audio fingerprints corresponding with the same channels as the multiple reference video fingerprints, and (ii) based on the comparing, determining that the digital audio fingerprint of the media content being rendered by the media presentation device matches just a single one of the reference audio fingerprints; and taking action based on the establishing that the media presentation device is receiving the media content on the single channel.

14. The non-transitory computer readable medium of claim 13, wherein the digital audio fingerprint of the media content being rendered by the media presentation device represents at least a language track of the media content being rendered by the media presentation device.

15. The non-transitory computer readable medium of claim 13, wherein taking action based on the establishing that the media presentation device is receiving the media content on the single channel comprises causing supplemental channel-specific content to be presented in conjunction with the media content being rendered by the media presentation device.

16. The non-transitory computer readable medium of claim 13, wherein taking action based on the establishing that the media presentation device is receiving the media content on the single channel comprises recording presentation of the single channel for use in a channel ratings system.

17. A system comprising:
a network communication interface;
a processing unit;
non-transitory data storage; and
program instructions stored in the non-transitory data storage and executable by the processing unit to carry out operations including:
receiving from a media presentation device, via the network communication interface, a digital video fingerprint of media content being rendered by the media presentation device,
determining that the received digital video fingerprint matches reference video fingerprints corresponding with multiple channels,
receiving from the media presentation device, via the network communication interface, a digital audio fingerprint of the media content being rendered by the media presentation device,
using the received digital audio fingerprint to determine which of the multiple channels carries the media content being rendered by the media presentation device, wherein using the received audio fingerprint to determine which of the multiple channels carries the media content being rendered by the media presentation device comprises (i) comparing the received digital audio fingerprint with reference audio fingerprints corresponding with the multiple channels, and (ii) based on the comparing, determining that the received digital audio fingerprint matches just a single one of the reference audio fingerprints, and
taking action based on the determined channel.

18. The system of claim 17, wherein the operations further comprise:
responsive to at least determining that the digital video fingerprint matches the reference video fingerprints corresponding with the multiple channels, sending to the media presentation device a request for the digital audio fingerprint of the media content being rendered by the media presentation device,
wherein receiving from the media presentation device the digital audio fingerprint of the media content being rendered by the media presentation device occurs in response to sending the request.

19. The system of claim 17, wherein taking action based on the determined channel comprises causing supplemental channel-specific content to be presented in conjunction with the media content being rendered by the media presentation device.

20. The system of claim 17, wherein taking action based on the determined channel comprises recording presentation of the determined channel for use in a channel ratings system.

* * * * *